United States Patent
Kim et al.

(10) Patent No.: US 9,479,770 B2
(45) Date of Patent: Oct. 25, 2016

(54) VIDEO ENCODING SYSTEM FOR DYNAMICALLY MANAGING ENERGY, RATE AND DISTORTION AND SURVEILLANCE SYSTEM USING THE SAME

(71) Applicant: CENTER FOR INTEGRATED SMART SENSORS FOUNDATION, Daejeon (KR)

(72) Inventors: Gi Won Kim, Seoul (KR); Kang Yi, Gyeongsangbuk-do (KR); Chong Min Kyung, Daejeon (KR)

(73) Assignee: CENTER FOR INTEGRATED SMART SENSORS FOUNDATION, Daejeon (KR)

( * ) Notice: Subject to any disclaimer, the term of this patent is extended or adjusted under 35 U.S.C. 154(b) by 280 days.

(21) Appl. No.: 14/222,560

(22) Filed: Mar. 21, 2014

(65) Prior Publication Data

US 2014/0286424 A1    Sep. 25, 2014

(30) Foreign Application Priority Data

Mar. 22, 2013  (KR) .................. 10-2013-0031182
Mar. 13, 2014  (KR) .................. 10-2014-0029561

(51) Int. Cl.
*H04B 1/66*    (2006.01)
*H04N 11/02*   (2006.01)
(Continued)

(52) U.S. Cl.
CPC .............. *H04N 19/00* (2013.01); *H04N 7/183* (2013.01); *H04N 7/188* (2013.01); *H04N 19/115* (2014.11); *H04N 19/156* (2014.11); *H04N 19/172* (2014.11); *H04N 19/127* (2014.11)

(58) Field of Classification Search
USPC ............ 375/240.16, 240.01, E7.121, E7.153
See application file for complete search history.

(56) References Cited

U.S. PATENT DOCUMENTS

2011/0306894 A1*  12/2011  Spaulding ............ A61B 5/0006
                                                    600/515

FOREIGN PATENT DOCUMENTS

EP          2 249 569 A1    11/2010
KR     10-2006-0104933     10/2006
KR     10-2011-0079939      7/2011

OTHER PUBLICATIONS

He. Zhihai He; Eggert, J.; Wenye Cheng; Xiwen Zhao; Millspaugh, J.; Moll, R.; Beringer, J.; Sartwell, J., "Energy-aware portable video communication system design for wildlife activity monitoring," in Circuits and Systems Magazine, IEEE , vol. 8, No. 2, pp. 25-37, Second Quarter 2008 doi: 10.1109/MCAS.2008.923007.*

(Continued)

*Primary Examiner* — Christopher S Kelley
*Assistant Examiner* — Ana Picon-Feliciano
(74) *Attorney, Agent, or Firm* — Marshall, Gerstein & Borun LLP (57) ABSTRACT

A video encoding system for dynamically managing energy, a data rate and data distortion is disclosed. The video encoding system for dynamically managing the energy, the data rate and the data distortion includes one or more sensors, an encoder configured to encode a signal obtained by the one or more sensors, an event sensing unit configured to determine whether an event is generated from the signal obtained by the one or more sensors, a memory configured to store the signal encoded by the encoder, a power supply unit configured to supply power to the one or more sensors, the event sensing unit, the encoder or the memory, and an control unit configured to control configuration of the energy supplied to the one or more sensors, the event sensing unit, the encoder or the memory.

12 Claims, 6 Drawing Sheets

(51) Int. Cl.
*H04N 19/00* (2014.01)
*H04N 7/18* (2006.01)
*H04N 19/172* (2014.01)
*H04N 19/115* (2014.01)
*H04N 19/156* (2014.01)
*H04N 19/127* (2014.01)

(56) References Cited

OTHER PUBLICATIONS

He2. Zhihai He; Wenye Cheng; Xi Chen, "Energy Minimization of Portable Video Communication Devices Based on Power-Rate-Distortion Optimization," in Circuits and Systems for Video Technology, IEEE Transactions on , vol. 18, No. 5, pp. 596-608, May 2008, doi: 10.1109/TCSVT.2008.918802.*

Cheng et al., "Doubling of the Operational Lifetime of Portable Video Communication Devices Using Power-Rate-Distortion Analysis and Control", IEEE International Conference on Image Processing, Oct. 1, 2006, pp. 2473-2476.

He et al., "Resource allocation and performance analysis of wireless video sensors", IEEE Transactions on Circuits and Systems for Video Technology, vol. 16, No. 5, May 1, 2006, pp. 590-599.

He et al., "Energy-aware portable video communication system design for wildlife activity monitoring", IEEE Circuits and Systems Magazine, IEEE Service Center, New York, New York, vol. 8, No. 2, Apr. 1, 2008, pp. 25-37.

Search Report for EP 14161126.9, dated Mar. 13, 2015.
Office Action for KR 10-2014-0029561, dated Jan. 9, 2015.

* cited by examiner

VIDEO ENCODING SYSTEM FOR DYNAMICALLY MANAGING ENERGY, RATE AND DISTORTION AND SURVEILLANCE SYSTEM USING THE SAME

This application claims priority from and the benefit of Korean Patent Application No. 10-2013-0031182, filed on Mar. 22, 2013, and Korean Patent Application No. 10-2014-0029561, filed on Mar. 13, 2014, which are hereby incorporated by references for all purposes as if fully set forth herein.

BACKGROUND OF THE DISCLOSURE

1. Field of the Disclosure

Exemplary embodiments of the disclosure relate to a video encoding system for dynamically managing an energy, a data rate and data distortion and a monitoring system using the same, more particularly, to a sensor node including a video encoding system for dynamically managing the energy, data rate and data distortion provided to an encoder based on a contents-dependent feature on an encoded signal, and a monitoring system for maximizing an operation time of a sensor network, using the same.

2. Discussion of the Background

Recently, a monitoring system or a video encoding system has developed into a wireless monitoring system, as the range of distance where data can be transmitted wirelessly, a rate of data is increased with development of wireless communication technologies. Examples of such developing wireless communication technologies include Bluetooth, ZigBee, Wi-Fi and the like.

A sensor node including such a video encoding system is operated in manners of Sleep & Awake for keeping only at least one sensor and an event sensing unit to be on normally and switching an encoder, a memory and a transmitting/receiving unit over from an off state to an on state, only when an event is generated, so as to reduce battery consumption. For instance, in Korean Patent No. 10-2009-0112979, an operation monitoring sensor notices a monitored operation to MCU and MCU applies a power to each of elements, when an operation monitoring sensor monitors an operation in a state where the other elements are not operated, except the operation monitoring sensor and MCU. After that, the data photographed by a camera is encoded in an encoder and the encoded data is transmitted to a server via a wireless communication module.

However, a conventional sensor node supplies energy to an encoder, not considering contents-dependent features on the signal encoded by the encoder. Accordingly, the sensor node could fail to perform efficient dynamic energy distribution disadvantageously. Moreover, the conventional sensor node supplies a preset amount of energy to each of the elements and a useable life of the sensor node cannot be maximized disadvantageously.

Accordingly, embodiments of the present disclosure proposes a technology of dynamically managing the energy supplied to an encoder, data rate and data distortion, especially, based on contents-dependent features on an encoded signal. The embodiments of the disclosure also proposes a technology of supplying energy to each of elements provided in a sensor node based on the energy supplied to an encoder.

SUMMARY OF THE DISCLOSURE

Exemplary embodiments of the present disclosure provide a video encoding system for dynamically managing the energy supplied to an encoder, data rate and data distortion based on contents-dependent features on an encoded signal and a monitoring system using the same.

Exemplary embodiments of the present disclosure also provide a video encoding system for adaptively controlling the energy supplied to the other elements provided in a sensor node, except an encoder, based on the energy supplied to an encoder and a monitoring system using the same.

Exemplary embodiments of the present disclosure also provide a video encoding system for minimizing the consumed energy by dynamically managing energy and a monitoring system using the same.

Exemplary embodiments of the present disclosure disclose a video encoding system for dynamically managing energy, a data rate and data distortion including one or more sensors; an encoder configured to encode a signal obtained by the one or more sensors; an event sensing unit configured to determine whether an event is generated from the signal obtained by the one or more sensors; a memory configured to store the signal encoded by the encoder; a power supply unit configured to supply power to the one or more sensors, the event sensing unit, the encoder or the memory; and an control unit configured to control configuration of the energy supplied to the one or more sensors, the event sensing unit, the encoder or the memory.

The control unit may extract a contents-dependent feature from the signal obtained through the one or more sensors, and determine at least one control parameter based on the contents-dependent feature.

The control unit may controls the energy supplied to the one or more sensors, the event sensing unit, the encoder or the memory based on the at least one control parameter.

control the energy supplied to the one or more sensors, the event sensing unit, the encoder or the memory based on the at least one control parameter.

The control unit may control the energy supplied to encoder to minimize the sum of weighted values of the energy consumed by the encoder, a data rate of the encoded signal and data distortion of the encoded signal, based on the at least one control parameter.

The control unit may estimate data distortion of the encoded signal based on the contents-dependent feature, and control the energy supplied to the encoder to minimize the sum of weighted values of the energy consumed by the encoder, a data rate of the encoded signal and data distortion of the encoded signal based on the estimated data distortion of the encoded signal.

In case the signal obtained by the one or more sensors includes a video signal, the contents-dependent feature may include at least one of movement of an object provided in the video signal, movement of one sensor sensing the video signal out of the one or more sensors and texture for the video signal.

At least one of the movement of the object, the movement of the sensor sensing the video signal and the texture for the video signal may be detected, using DCT (Discrete Cosine Transform Coefficient) or motion vector of the video signal.

The control unit may control the energy supplied to the one or more sensors, the event sensing unit or the memory in accordance with the energy supplied to the encoder.

The control unit may minimize the total energy consumed by the one or more sensors, the event sensing unit, the encoder and the memory.

The control unit may control the energy supplied to the encoder and the energy supplied to the memory based on an encoding bit rate for minimizing the sum of the energies consumed by the encoder and the memory.

The video encoding system for dynamically managing the energy, the data rate and the data distortion may further include a transmitting/receiving unit configured to transmit the encoded signal to the base station or receive a command associated with the encoded signal from the base station.

In case a storage space remaining in the memory is smaller than a preset reference storage space, the control unit may control at least one of the energy supplied to the one or more sensors, the energy supplied to the event sensing unit, the energy supplied to the encoder and the energy supplied to the transmitting/receiving unit.

The control unit may control the energy supplied to the encoder to encode the signal obtained by the one or more sensors at an encoding bit rate lower than an encoding bit rate for minimizing the sum of the energies consumed by the encoder and the memory.

The control unit may control the energy supplied to the one or more sensors and the energy supplied to the event sensing unit, to prevent false positive when determining generation of the event.

The control unit may control the energy supplied to the transmitting/receiving unit to transmit the signal encoded by the encoder directly to a base station, not stored in the memory.

According to the exemplary embodiments of the disclosure, a video encoding system may dynamically manage the energy supplied to an encoder, data rate and data distortion based on contents-dependent features on an encoded signal and a monitoring system using the same.

Exemplary embodiments of the present disclosure also provide a video encoding system for adaptively controlling the energy supplied to the other elements provided in a sensor node, except an encoder, based on the energy supplied to an encoder and a monitoring system using the same.

Exemplary embodiments of the present disclosure also provide a video encoding system for minimizing the consumed energy by dynamically managing energy and a monitoring system using the same.

It is to be understood that both the foregoing general description and the following detailed description are exemplary and explanatory and are intended to provide further explanation of the disclosed subject matter as claimed.

BRIEF DESCRIPTION OF THE DRAWINGS

The accompanying drawings, which are included to provide a further understanding of the disclosed subject matter and are incorporated in and constitute a part of this specification, illustrate exemplary embodiments of the disclosed subject matter, and together with the description serve to explain the principles of the disclosed subject matter.

DETAILED DESCRIPTION OF THE ILLUSTRATED EMBODIMENTS

Exemplary embodiments of the disclosed subject matter are described more fully hereinafter with reference to the accompanying drawings. The disclosed subject matter may, however, be embodied in many different forms and should not be construed as limited to the exemplary embodiments set forth herein. Rather, the exemplary embodiments are provided so that this disclosure is thorough and complete, and will convey the scope of the disclosed subject matter to those skilled in the art. In the drawings, the size and relative sizes of layers and regions may be exaggerated for clarity. Like reference numerals in the drawings denote like elements.

It will be understood that when an element or layer is referred to as being "on", "connected to", or "coupled to" another element or layer, it can be directly on, connected, or coupled to the other element or layer or intervening elements or layers may be present. In contrast, when an element is referred to as being "directly on", "directly connected to", or "directly coupled to" another element or layer, there are no intervening elements or layers present. As used herein, the term "and/or" includes any and all combinations of one or more of the associated listed items. It may also be understood that for the purposes of this disclosure, "at least one of X, Y, and Z" can be construed as X only, Y only, Z only, or any combination of two or more items X, Y, and Z (e.g., XYZ, XYY, YZ, ZZ).

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another region, layer or section. Thus, a first element, component, region, layer, or section discussed below could be termed a second element, component, region, layer, or section without departing from the teachings of the present disclosure.

The terminology used herein is for the purpose of describing exemplary embodiments only and is not intended to be limiting of the disclosed subject matter. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the disclosed subject matter are described herein with reference to cross-section illustrations that are schematic illustrations of idealized embodiments (and intermediate structures) of the disclosed subject matter. As such, variations from the shapes of the illustrations as a result, for example, of manufacturing techniques and/or tolerances, are to be expected. Thus, exemplary embodiments of the disclosed subject matter should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the disclosed subject matter will be described in detail with reference to the accompanying drawings.

Figure 1:
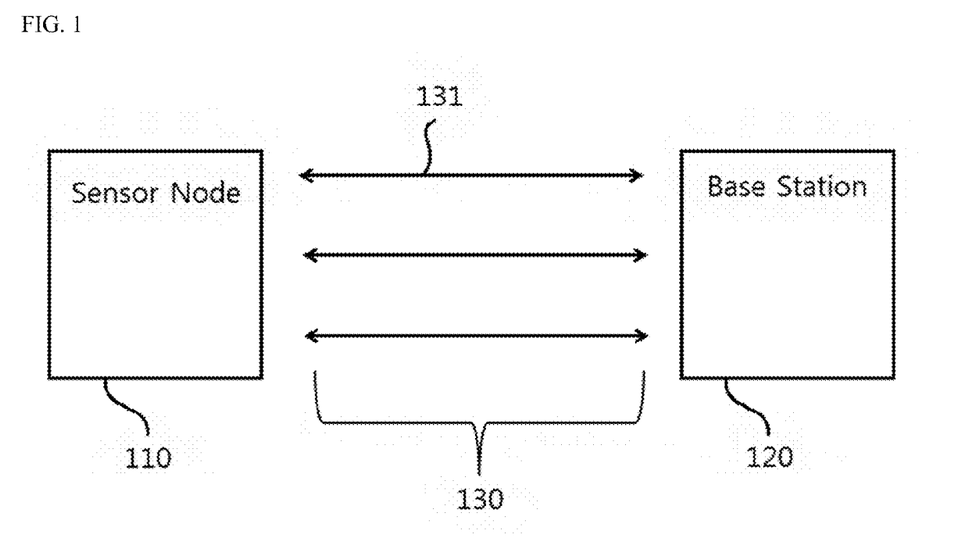
FIG. 1 is a diagram illustrating a monitoring system which includes a sensor node having a video encoding system for dynamically managing energy, a data rate and data distortion according to exemplary embodiments of the disclosure.

FIG. 1 is a diagram illustrating a monitoring system which includes a sensor node having a video encoding system for dynamically managing energy, a data rate and data distortion according to exemplary embodiments of the disclosure.

Referring to FIG. 1, the monitoring system according to the exemplary embodiments of the disclosure includes a sensor node 110 for dynamically managing energy, a data rate and data distortion and a base station 120.

The base station 120 may receive a signal for a obtained event from the sensor node 110 so as to manage event generation of a region in which the sensor node 110 is located. For instance, when receiving the signal encoded from a signal having obtained an event from the sensor node 110, the base station 120 may transmit a command associated with the encoded signal to the sensor node 110. More specifically, when receiving the signal encoded after sensing the event from the sensor node 110, the base station 120 may transmit a command to the sensor node 110 to enhance the reliability of the sensor node 110 sensing the event. In the drawing, the monitoring system is configured of one sensor node 110 and one base station 120 and the monitoring system may be configured of a plurality of sensor nodes and a plurality of base stations.

The monitoring system according to the exemplary embodiments of the disclosure may include the sensor node 110 for dynamically managing the energy, data rate and data distortion. The sensor node 110 and the base station 120 are connected with each other via a communication passage 131 configurated to minimize the energy consumed by the data transmission, such that the energy can be managed efficiently. For instance, when a plurality of communication passages 130 are provided between the sensor node 110 and the base station 120, the sensor node 110 and the base station 120 are connected with each other via one communication passage 130 configurated to minimize the energy consumed by the transmission of the signal encoded by the encoder provided in the sensor node 110 to the base station 120, such that the energy consumed by the data transmission can be minimized.

Moreover, the energy supplied to each of the elements provided in the sensor node 110 may be dynamically managed and the energy consumed by the sensor node 110 can be managed. The sensor node 110 for dynamically managing the energy, data rate and data distortion will be described in detail hereinafter.

Figure 2:
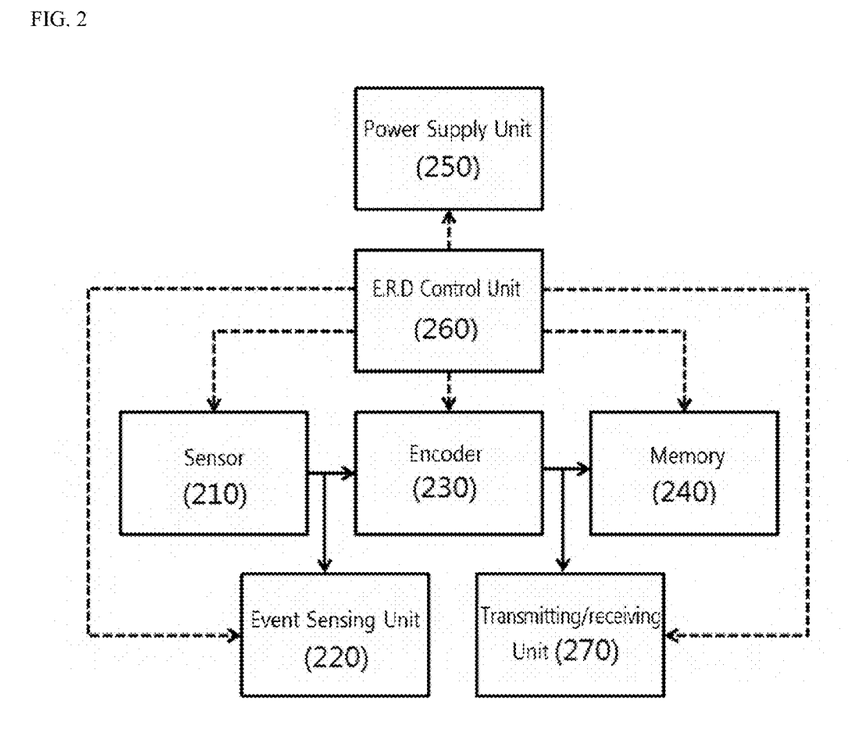
FIG. 2 is a diagram illustrating a sensor node according to exemplary embodiments of the disclosure.

FIG. 2 is a diagram illustrating the sensor node according to the embodiments of the disclosure.

Referring to FIG. 2, the sensor mode according to the present embodiment includes one or more sensors 210, an event monitoring unit 220, an encoder 230, a memory 240, a power supply unit 250 and an ERD control unit (control unit) 260. In FIG. 2, a dotted line may refer to a control signal of the ERD control unit 260 and a solid line may refer flow of data.

The one or more sensors 210 may sense a signal for determining generation of an event. A plurality of sensors may be configurated to detect a plurality of different signals. For instance, the one or more sensors 210 may include at least one of a CMOS signal for sensing a video signal, an audio sensor for sensing an audio sensor, an infrared sensor for sensing a thermal signal, an acceleration sensor for sensing a vibration/motion signal and a GPS sensor for sensing a location signal.

Such the one or more sensors 210 may drive the sensors simultaneously or drive only one sensor, with keeping the other sensors in an off state, so as to reduce energy consumption or to make it appropriate to sense events generated in a specific environment frequently. At this time, the sensor driven normally and the sensors driven when an event is obtained may be determined based on a grade of energy consumption for each sensor. For instance, the one or more sensors 210 may include an infrared sensor and a CMOS sensor and it may drive only the infrared sensor having a relatively less energy consumption rate and the CMOS sensor only when an event is obtained from the signal obtained by the infrared sensor.

Alternatively, the one or more sensors 210 may sequentially drive the same sensor at different levels so as to reduce the consumed energy and to enhance the event sensing reliability. For instance, grades are given to the CMOA sensor based on resolution and recognition of the CMOA sensor and the CMOA sensor may be sequentially driven according to the grades. More specifically, the CMOA sensor is normally driven at a bit rate of 1 Mbps and it may be driven at 5 Mbps or 10 Mbps when an event is obtained from the signal obtained by the CMOS sensor, such that the reliability of the event sensing can be enhanced to prevent false positive in determining the event generation may be prevented. In this instance, the energy supplied to the CMOS sensor may be increased and a setting for an overall energy supplied to the sensor node can be changed.

The one or more sensors 210 may switch between an on state and an off state at preset time intervals to lower the consumed energy, such that the overall energy setting for the sensor node can be changed. For instance, the infrared sensor may switch between an on state and off state at 1 or 2 second intervals so as to sense presence of a person in a specific region.

The one or more sensors 210 may be controlled by the control for the energy supplied to the one or more sensors 210 performed by the ERD control unit 260. For instance, the ERD control unit 260 may receive/transmit a signal for controlling the energy consumed by the one or more sensors 210, only to control the energy supplied to the one or more sensors 210.

The event sensing unit 220 may determine whether an event is generated based on the signal obtained by the one or more sensors 210. The generation of the event may be determined based on the result from the determination of whether the signal obtained by the one or more sensors 210 is larger or smaller than a preset threshold value. For instance, when an audio signal ($S_d$) obtained by the one or more sensors 210 is larger than a preset threshold value ($S_{th}$), the event sensing unit 220 may sense that the event is generated.

When the one or more sensors 210 include a plurality of sensors, the event sensing unit 220 may compare threshold values preset for the sensors with the sensors, respectively, and determine the generation of the event based on the result of the comparison. For instance, only when the signals transmitted by the three grade sensors in case the event generation is determined by three grade sensors are larger than threshold values preset for the three sensors, respectively, it can be determined that the event is generated. Accordingly, when the energy supplied to the event sensing unit 220 is increased, the reliability of the event sensing may be enhanced and the energy may be prevented from being consumed in encoding and storing unnecessary data generated by false positive events.

When the signals obtained by the one or more sensors including the CMOS sensor has a video signal, the event sensing unit 22—may determine event generation from a video signal based on the result from determination whether a difference between a reference frame and a transmitted frame is larger than a preset threshold value. In this instance, the reference frame is a frame before 1 second and the transmitted frame is a frame serially following the reference frame. The transmitted frame may be a frame currently transmitted from the CMOS sensor. For instance, there is no object in the reference frame and an object in the transmitted frame. If then, a difference may be generated among pixels corresponding to a profile of the object. The sum of the differences in the pixel values means SAD (Sum of Absolute Difference). When a value of SAD is larger than a preset limit, it can be determined that an event is generated. The reliability of the video signal event generation may be in proportion to a rate of the data configurating a video signal (the resolution of the image read by the CMOS sensor and the number of frames per second) and calculations of the event sensing unit 220 (the number of SAD calculations). Accordingly, the reliability of the event generation may be enhanced more and more as the energy supplied to the one or more sensors 210 and the event sensing unit 220 is increased more and more.

It may be determined based on an event generation signal from the base station or another sensor node or a user's forcible input whether an event is generated from the signal obtained by the one or more sensors 210. For instance, when the base station is recognizing an event generated in a sensing region of a first sensor node, or when the base station needs to receive a signal obtained by the one or more sensors 210 from a first sensor node, the base station may transmit an event generation signal to a first sensor node and the event sensing unit 220 provided in the first sensor node may sense the generated event based on the event generation signal. At this time, the event sensing unit 220 may determine that the event is obtained, regardless of generation of an actual event in the signal obtained by the one or more sensors. Accordingly, the base station may receive the signal obtained by the one or more sensors 210.

That case is applicable when another sensor node distinguished from the first sensor transmits an event generation signal. For instance, when an event is generated in the signal obtained by a second sensor node distinguished from the first sensor node, an event generation signal is transmitted to the first sensor node from a second sensor node and an event sensing unit 220 provided in the first sensor node may determine that an event is generated in the first sensor node.

The event sensing unit 220 may sense that an event is generated in the signal obtained by the one or more sensors 210 based on the user's forcible input. For instance, when the sensor node is a mobile terminal carried with the user, the user may directly input an event generation signal and acquire the signal obtained by the one or more signals. At this time, the user's forcible input may be realized easily when a push button is provided in the sensor node.

The event sensing unit 220 may include an event sensing logic configured of a plurality of steps having different accuracies for sensing an event in the signal obtained by the one or more sensors 210. In this instance, a logic consuming much energy may sense an event more accurately than a logic consuming less energy. For instance, when the one or more sensors 210 include a CMOS sensor and when the signals obtained by the one or more sensors 210 include a video signal, a logic of the event sensing unit 220 for determining only movement of an object in the video signal consumes less energy and a logic for determining whether a moving object is a human or a vehicle may consume much energy. If there may be three steps of event sensing logics, the event sensing unit 220 may more specifically determine that an event is generated, using a third step event sensing logic only after determining that an event is generated in the signal obtained by the one or more sensors 210 in accordance with a third step event sensing logic and a second step event sensing logic.

The event sensing unit 220 driven as mentioned above may be controlled by control of the energy supplied to the event sensing unit 210 by the ERD control unit 260. For instance, the ERD control unit 260 may transmit a signal for controlling the energy consumed by the event sensing unit so as to control the energy supplied to the event sensing unit 220.

The encoder 230 may encode the signal obtained by the one or more sensors 210. When an event is generated in the signal obtained by the one or more sensors 210, the encoder 230 may encode the signal obtained by the one or more sensors 210 in accordance with a preset encoding logic. Accordingly, a plurality of encoders may be provided to support a plurality of preset encoding logics. For instance, a plurality of encoders may be provided in accordance with a type of a signal obtained by the one or more sensors 210. Specifically, when the one or more sensors 210 include a CMOS sensor and an audio sensor, the encoder 230 may include a video encoder and an audio encoder. Accordingly, the video encoder may encode a video signal obtained by the CMOS sensor and the audio encoder may encode an audio signal obtained by the audio sensor.

The encoding logic used in the encoder 230 may be set to minimize the sum of weighted values of the energy consumed by the encoder 230, the data rate of the encoded signal and the data distortion of the encoded signal. A correlation among the energy consumed by the encoder 230, the data rate of the encoded signal and the data distortion of the encoded signal is as follows:

1) When the energy supplied to the encoder 230 is fixed, there is a negative correlation between the data rate of the encoded signal and the data distortion of the encoded signal. For instance, in case the data rate of the encoded signal is decreased when the energy consumed by the encoder 230 is fixed, information contained in the data has to be partially omitted. Accordingly, data quality cannot help deteriorating enough to increase the data distortion of the encoded signal.

2) When the data rate of the encoded signal is fixed, there is a negative correlation between the energy consumed by the encoder 230 and the data distortion of the encoded signal. For instance, in case the energy consumed by the encoder 230 is increased when the data rate of the encoded signal is fixed, an encoding logic for reducing the loss of original data can be used and the data distortion of the encoded signal may be then reduced.

3) When the data distortion of the encoded signal is fixed, there is a negative correlation between the energy consumed by the encoder 230 and the data distortion of the encoded signal. For instance, in case the energy consumed by the encoder 230 is increased when the data distortion of the encoded signal is fixed, an encoding logic having a higher data compressibility can be adopted and the data rate of the encoded signal can be then reduced.

In the sensor node for dynamically managing the energy, the data rate and the data distortion according to the embodiment of the disclosure, one of the energy supplied to the encoder 230, the data rate of the encoded signal or the data distortion of the encoded signal is set as a constraint condition and the other two except the constraint condition may be dynamically controlled, only to minimize the sum of weighted values of the energy, the data rate and the data distortion.

Specifically, the encoder 230 according one embodiment of the disclosure may use an encoding logic for minimizing the sum of weighted values of the energy consumed by the encoder 230, the data rate of the encoded signal and the data distortion of the encoded signal, based on contents-dependent features on the signal obtained by the one or more sensors 210. At this time, the control of the encoder 230 may be performed by controlling the energy supplied to the encoder 230 by the ERD control unit 260.

For instance, when the signal obtained by the one or more sensors 210 includes a video signal, the data distortion of the encoded signal is estimated based on contents-dependent features on a video signal which include movement of an object, movement of a sensor sensing a video signal or texture on a video signal, such that the encoder 230 can operate to minimize the energy consumed by the encoder, the data of the encoded signal and the data distortion of the encoded signal, which will be described in detail as follows.

The memory 240 may store the signal encoded by the encoder 230. For instance, the memory 240 may include a Flash memory. A remaining storage space of the memory 240 is a factor which can affect the energy distribution of the sensor node. For instance, in case a remaining storage space of the memory 240 is smaller than a preset reference storage space, the sensor node may increase the energy supplied to the other elements provided in the sensor node and a total life time of the sensor node can be increased, which will be described later, referring to FIG. 5.

The power supply unit 250 may supply energy to the one or more sensors 210, the event sensing unit 220, the encoder 230 and the memory 240. According to the control of the ERD control unit 260, the power supply unit 250 may supply energy to each of the one or more sensors 210, the event sensing unit 220, the encoder 230 and the memory 240. The power supply unit 250 may check a residual quantity of the stored energy in accordance at preset check intervals and transmit the checked residual quantity to the ERD control unit 260, such that the ERD control unit 260 can control the energy supplied to each of the elements provided in the sensor node based on the residual quantity of the energy stored in the power supply unit 250. At this time, the power supply unit 250 may include a battery.

The ERD control unit 260 may extract the contents-dependent features on the signal obtained by the one or more sensors 210 and control the energy supplied to the one or more sensors 210, the event sensing unit 220, the encoder 230 or the memory based on the extracted contents-dependent features. At this time, the ERD control unit 260 may transmit control signals to the one or more sensors 210, the event sensing unit 220, the encoder 230 and the memory 240, respectively, only to control the energy consumed by the one or more sensors 210, the event sensing unit 220, the encoder 230 or the memory 240.

Especially, the ERD control unit 260 may control the encoder 230 to minimize the sum of weighted values of the energy consumed by the encoder 230, the data rate of the encoded signal and the data distortion of the encoded signal. At this time, the ERD control unit 260 may control the energy supplied to the encoder 230 so as to minimize the sum of weighted values of the energy consumed by the encoder 230, the data rate of the encoded signal and the data distortion of the encoded signal, only to control the encoder 230.

The ERD control unit 260 may control the energy supplied to the one or more sensors 210, the event sensing unit 220 or the memory 240 in accordance with the energy supplied to the encoder 230. For instance, the energy may minimize the total energy consumed by the one or more sensors 210, the event sensing unit 220, the encoder 230 and the memory 240 in accordance with the energy supplied to the encoder. Specifically, the ERD control unit 260 may control the energy supplied to the encoder and the energy supplied to the memory 240 based on an encoding bit rate for minimizing the sum of the energy consumed by the encoder and the energy consumed by the memory 240.

The ERD control unit 260 may receive a state signal from the one or more sensors 210, the event sensing unit 220, the encoder 230 or the memory 240 and control the energy supplied to the one or more sensors 210, the event sensing unit 220, the encoder 230 or the memory 240 based on the state signal of the one or more sensors 210, the event sensing unit 220, the encoder 230 or the memory 240. For instance, the ERD control unit 260 may receive a notice that an event is generated in the signal obtained by the one or more sensors 210 and control the encoder 230 to encode the signal obtained by the one or more sensors 210 in response to the notice. Accordingly, the overall energy configuration of the sensor node may be formed to dynamically manage the energy, data rate and data distortion according to the embodiment of the disclosure.

The sensor node according to one embodiment of the disclosure may further include a transmitting/receiving unit 270 for transmitting an encoded signal to a base station or receiving a command associated with the encoded signal from the base station. At this time, the transmitting/receiving unit 270 may transmit the encoded signal to the base station based on preset transmission period or receive the encoded signal from the base station based on a data transmission request.

The transmitting/receiving unit 270 may transmit the encoded signal stored in the memory 240 to the base station or transmit the encoded signal directly transmitted from the encoder 230 to the base station. Such the transmitting/receiving unit 270 may transmit to the ERD control unit 260 a channel state signal considering a busy ratio of channels along a communication passage between the sensor node and the base station, a relative intensity or a standby state. In response to the channel state signal, the transmitting/receiving unit 270 may operate to consume the energy in accordance with the control signal received from the ERD control unit 260.

The ERD control unit 260 according to the embodiment of the disclosure may control the energy supplied to the one or more sensors 210, the event sensing unit 220, the encoder 230, the memory 240 and the transmitting/receiving unit 270, only to minimize the energy consumed by the sensor node entirely. Especially, the ERD control unit may control the energy supplied to each of the one or more sensors 210, the event sensing unit 220, the encoder 230, the memory 240 and the transmitting/receiving unit 270, based on a contents-dependent feature from the signal obtained through the one or more sensors 210.

An operation standard of the ERD control unit may be configurated based on a case where it is determined that the energy stored in the power supply unit 250 will be exhausted before all of the data is stored in a sufficient remaining storage space of the memory 240 and a case where there is no free storage space of the memory 240, with the remaining storage space smaller than a preset reference storage space, before the energy stored in the power supply unit 250 is exhausted. Detailed description on the ERD control unit 260 will be disclosed, referring to FIG. 5.

Figure 3:
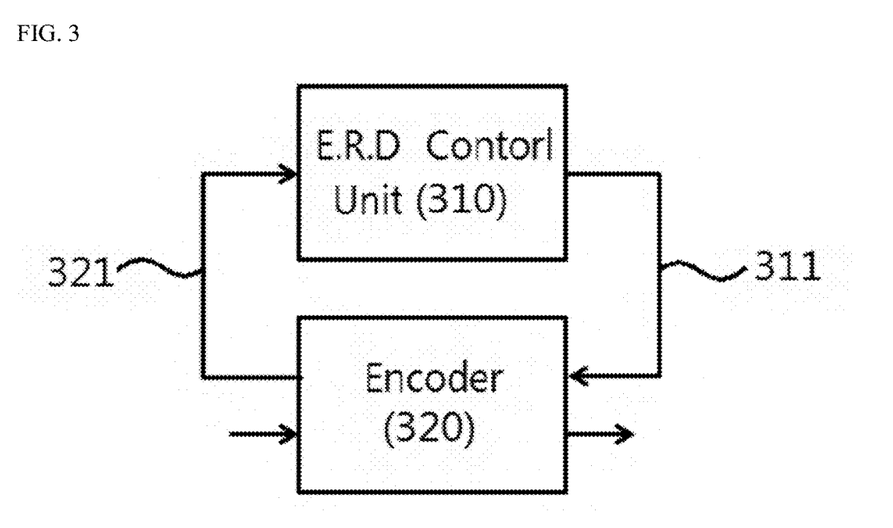
FIG. 3 is a diagram illustrating an encoder and an ERD control unit (control unit) according to exemplary embodiments of the disclosure.

FIG. 3 is a diagram illustrating an encoder and an ERD control unit according to one embodiment of the disclosure.

Referring to FIG. 3, an ERD control unit 310 and an encoder 320 according to one embodiment of the disclosure are shown.

The ERD control unit 310 according to this embodiment may transmit a control signal 311 for operating the encoder 320 to the encoder 320 to minimize the sum of weighted values of the energy consumed by the encoder 320, a data rate of an encoded signal and data distortion of an encoded signal, based on a contents-dependent feature on a signal obtained by one or more sensors, such that it may control the energy consumed by the encoder. Accordingly, the ERD control unit 310 may control the energy supplied to the encoder 320 based on the contents-dependent feature from the signal obtained through the one or more sensors. Hereinafter, the ERD control unit 310 and the encoder 320 will be described, just in case a signal obtained by the one or more sensors including a CMOS sensor includes a video signal. The embodiments of the disclosure are not limited thereto and the ERD control unit 310 and the encoder 320 may be operated in accordance with various signals obtained by various types of sensors.

Specifically, the ERD control unit 310 may transmit to the encoder 320 a control signal 311 including at least on control parameter configured to operate the encoder 320 to minimize the energy consumed by the encoder 320, a data rate of an encoded signal and data distortion of an encoded signal for a second frame (a current frame) of the signal obtained by the one or more sensors based on an energy consumed by the one or more sensors, a data rate of an encoded signal and data distortion of an encoded signal for a first frame (the former frame of a current frame) of the signal obtained by the one or more sensors, such that it may control the operation of the encoder for the current frame. At this time, the at least on control parameter may include data rate control parameters associated with an encoding operation of the encoder, energy control parameters and data distortion control parameters. Accordingly, the encoder 320 may control the energy consumed in the encoding operation by the control signal 311 and the ERD control unit 310 may use the control signal, such that the ERD control unit 310 may adaptively control the energy supplied to the encoder 320.

Here, the ERD control unit 310 may receive a monitor signal 321 from the encoder 320. The monitor signal 321 includes the contents-dependent feature from the signal obtained through the one or more sensors, the energy consumed by the encoder 320 for the former frame, not the current frame, the data rate of the encoded signal and the data distortion of the encoded signal. Accordingly, the ERD control unit 310 may control the operation of the encoder 320 based on the monitor signal 321.

When controlling the encoding operation of the encoder 320, the ERD control unit may estimate and use data distortion of an encoded signal for a second frame of the signal obtained by the one or more sensors, as well as the energy consumed by the encoder, the data rate of the encoded signal and the data distortion of the encoded signal for a first frame of the signal obtained by the one or more sensors. At this time, the data distortion of the encoded signal for the second frame may be estimated based on a contents-dependent feature for the second frame, because the encoding operation for the second frame is not performed. For instance, the ERD control unit 310 may estimate the data distortion of the encoded signal for the second frame based on a contents-dependent feature including one or more of movement of an object provided in the second frame, movement of one sensor sensing a video signal out of the one or more sensors and texture for the video signal. At this time, one or more of the movement of the object, the movement of the sensor sensing the video signal and the texture for the video signal for the second frame may be detected, using DCT (Discrete Cosine Transform Coefficient) or motion vector of the video signal. For instance, when an encoding code of the encoder 230 is Intra Mode, movement estimation is not performed by the encoder 230 and the data distortion of the encoded signal for the second frame is measured and used, not estimated. When an encoding code of the encoder 230 is Inter Mode, movement estimation is supported by the encoder 230 and the data distortion of the encoded signal for the second frame is estimated and used. The movement may be estimated based on the number of the inter modes, intra modes or skip modes. For instance, when relatively many intra modes are used, it may be estimated that there are many scene changes or there is a big movement.

The ERD control unit 310 according to the embodiment of the disclosure may estimate or measure the data distortion of the encoded signal for the second frame based on the contents-dependent feature for the second frame. Hence, the ERD control unit 310 may control the energy supplied to the encoder 320 to minimize the sum of weighted values of the energy consumed by the encoder 320, the data rate of the encoded signal and the data distortion of the encoded signal, based on the estimated or measured data distortion of the encoded signal for the second frame and the energy consumed by the encoder 320, the data rate of the encoded signal and the data distortion of the encoded signal for the first frame.

After optimizing and controlling the energy supplied to the encoder 320, the ERD control unit 310 may control the energy supplied to the one or more sensors, the event sensing unit, the memory or the transmitting/receiving unit, in accordance with the energy supplied to the encoder 320. At this time, the ERD control unit 310 may control the energy supplied to the one or more sensors, the event sensing unit, the encoder 320, the memory or the transmitting/receiving unit so as to minimize the total energy consumed by the one or more sensor, the event sensing unit, the encoder 320, the memory or the transmitting/receiving unit.

Figure 4:
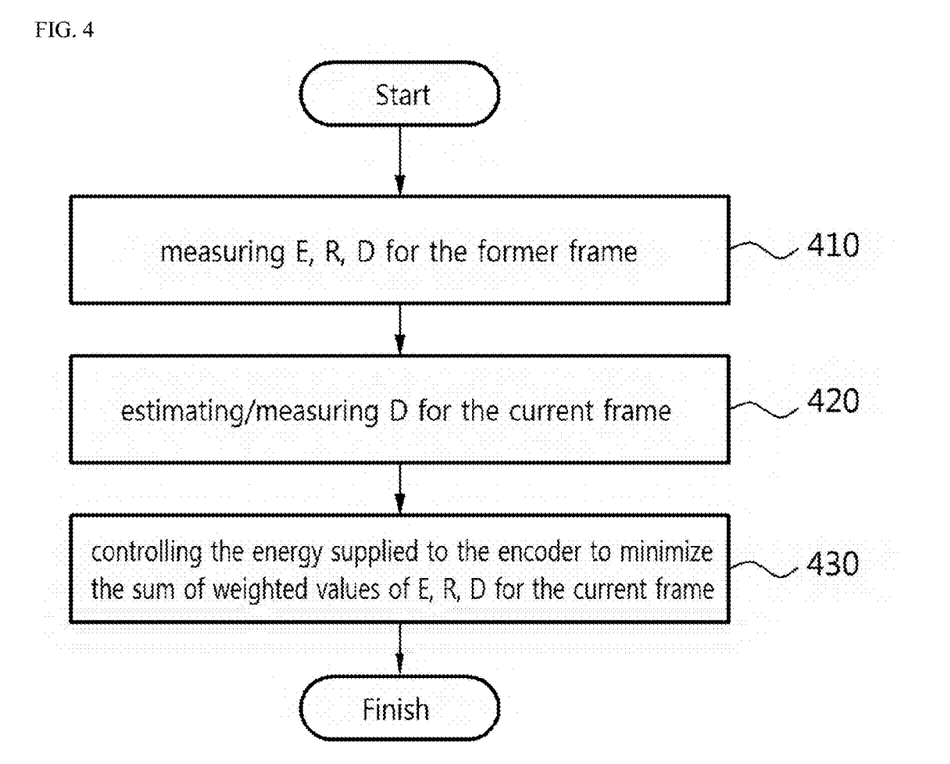
FIG. 4 is a flow chart illustrating a method for controlling the energy supplied to an encoder according to exemplary embodiments of the disclosure.

FIG. 4 is a flow chart illustrating a method for controlling the energy supplied to the encoder according to one embodiment of the disclosure.

Referring to FIG. 4, the ERD control unit according to the embodiment of the disclosure may measure the energy consumed by the encoder, a data rate of an encoded signal and data distortion of the encoded signal for the former frame (410).

Hence, the ERD control unit may estimate data distortion of an encoded signal for a current frame based on a contents-dependent feature on a current frame (420). At this time, the contents-dependent feature on the current frame may include one or more of movement of an object in the current frame which can be detected, using DCT of a video signal, movement of one sensor sensing a video signal and texture for a video signal.

The ERD control unit may measure data distortion of an encoded signal for a current frame based on a contents-dependent feature on a current frame, in accordance with a mode of the encoder.

After that, the ERD control unit may control the energy supplied to the encoder to minimize the sum of weighted values of the energy consumed by the encoder, a data rate of an encoded signal and data distortion of an encoded signal for a current frame, based on the estimated data distortion of the encoded signal for the current frame and the energy consumed by the encoder, the data rate of the encoded signal and the data distortion of the encoded signal for the former frame (430).

The algorithm described in FIG. 4 may be performed in different form as following steps.

Step 1: extract the contents-dependent frame signatures including temporal(motion) and spatial features (edges) by using DCT coefficients, motion vectors, or ratio of prediction mode for encoding result of previous frames.

Step 2: find (compute) the encoder control parameters for the current frame including QP value, GOP size, search rage for motion estimation based on the contents-depended signayure of previous frame and ERD computing model Step 3: compute the difference of estimation and measured value of previous ERD Step 4: revise the parameter value reflecting the difference in step 3

Step 5: repeat Step 1.

Figure 5:
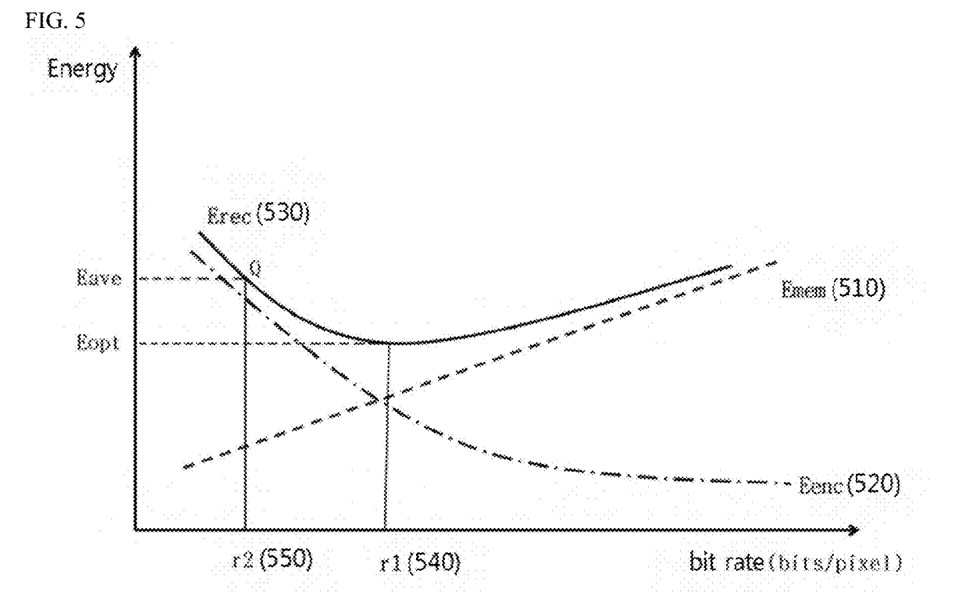
FIG. 5 is a diagram showing a graph of sums of the energy consumed by an encoder and a memory according to exemplary embodiments of the disclosure.

FIG. 5 is a graph showing the sum of the energy consumed by the encoder and the energy consumed by the memory according to the embodiment of the disclosure.

Referring to FIG. 5, a bit rate of the data stored in the memory is increasing more and more, as an encoding bit rate is increasing more and more. The energy consumed by the memory ($E_{mem}$, 510) increases in proportion to the encoding bit rate. The meaning of the encoding bit rate is high when the data rate transmitted from the one or more sensors is uniform is that a data compressibility is low. Accordingly, the energy consumed by the encoder ($E_{enc}$, 520) monotonically decreases with respect to the encoding bit rate.

The sensor node uses the signal encoded by the encoder stored in the memory. Especially, the energy consumed by the sensor node is mostly consumed by both of the encoder for the encoding the sensor obtained by the one or more sensors and the memory for storing the encoded signal. Accordingly, the energy management in the recording process in which the signal is encoded in the encoder and the memory has to be performed for the dynamic energy management of the sensor node.

A recording energy ($E_{rec}$, 530) has a convex-downward curved line along the energy 510 consumed by the memory and the energy 520 consumed by the encoder. At this time, the recording energy 530 is the lowest at an encoding bit rate (r1). When determining that the energy stored in the power supply unit will be exhausted before all of the data is stored in a sufficient free storage space of the memory, the ERD control unit calculates the energy consumed by each of the encoder and the memory, based on the encoding bit rate (r1, 540), such that it may control the energy supplied to each of the encoder and the memory, corresponding to the calculated energy for each of them.

In contrast, when a free storage space remaining in the memory is smaller than a preset reference storage space (in other words, when there is no free storage space remaining in the memory before the energy stored in the power supply unit is exhausted), the ERD control unit may adaptively control one or more of the energy supplied to the one or more sensors, the energy supplied to the event sensing unit, the energy supplied to the encoder and the energy supplied to the transmitting/receiving unit.

At this time, the ERD control unit may control the energy supplied to the encoder to encode the signal obtained by the one or more sensors at an encoding bit rate (r2, 550) which is lower than the encoding bit rate for minimizing the sum of the energies consumed by the encoder and the memory. For instance, the ERD control unit may increase the energy supplied to the encoder, to reduce the rate of the data stored in the memory and to heighten only the data compressibility, with keeping the data distortion. Specifically, when the residual quantity of the energy stored in the power supply unit is divided into memory exhaustion estimation time periods and an average energy ($E_{ave}$) larger than the energy ($E_{opt}$) at the encoding bit rate (r1, 540) is calculated. The life time of the sensor node is not restricted by the power supply unit, even when the energy is continuously supplied at the average energy ($E_{ave}$) in the worst case. Accordingly, when a horizontal line is drawn in parallel with an axis of the bit rate from the average energy (Eave), the energy supply is possible to a point (Q) between the horizontal line and $E_{enc}$. $E_{enc}$ is configured to be large and $E_{mem}$ is configured to be small (small $E_{mem}$ means that a rate of the data stored in the memory is small), such that the overall life time of the sensor node can be extended.

The ERD control unit may prevent false positive and enhance the reliability of the event sensing, when determining event generation. Accordingly, unnecessary data cannot be stored in the memory. For instance, the event control unit may increase the energy supplied to the one or more sensors and the energy supplied to the event sensing unit, such that it can prevent the false positive and enhance the reliability of the event sensing.

The ERD control unit may increase the energy supplied to the transmitting/receiving unit to transmit the signal encoded by the encoder to the base station directly, not to store the encoded signal in the memory.

The operations of the ERD control unit mentioned above may be performed independently or combination of two or more operations may be performed.

Moreover, the ERD control unit may control the energy supplied to each of the one or more sensors, the event sensing unit, the encoder, the memory and the transmitting/receiving unit, considering a channel state (e.g., SNR (Signal-Noise Ratio)). A control method of the ERD control unit may use a clock frequency, a supplied voltage, current conversion or operation mode switch. For instance, there may be mode switch over to Power-Down mode for blocking the power down, Sleep mode for cutting off the power until awakened by an external device, Idle mode for supplying power, not controlling calculation or control and Active mode for operating normally, with normal power supply. At this time, the sleep mode, the idle mode or the active mode may be subdivided based on characteristics of a control object controlled by the ERD control unit or the sleep mode, the idle mode or the active mode may be switched over to an intermediate mode.

Figure 6:
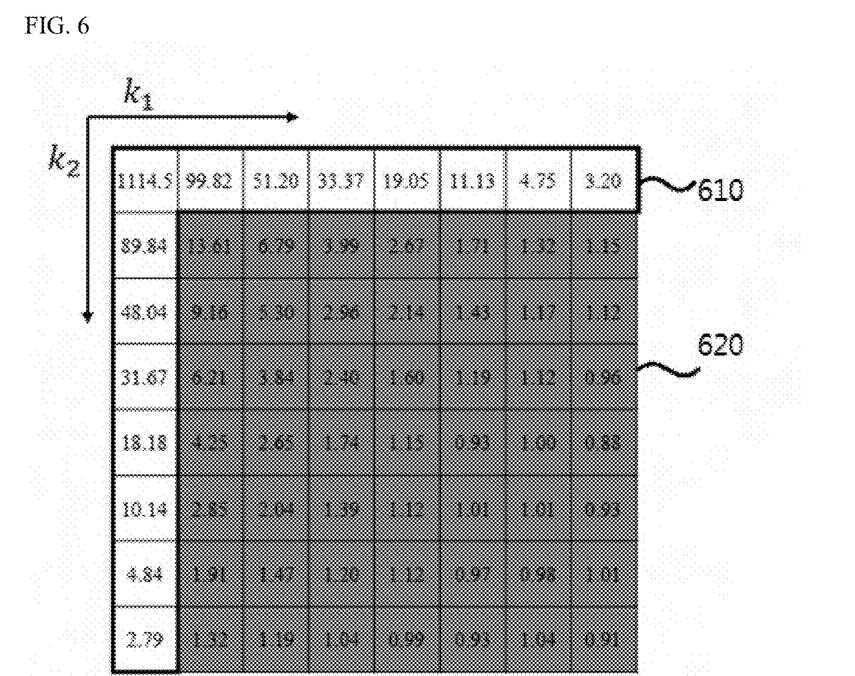
FIG. 6 illustrates frequency components of the video image according to exemplary embodiments of the disclosure.

FIG. 6 illustrates frequency components of the video image according to exemplary embodiments of the disclosure.

The present invention may extract the contents-dependent feature based on movement of an object provided in the video signal, movement of one sensor sensing the video signal out of the one or more sensors and texture for the video signal. The movement of an object provided in the video signal, movement of one sensor sensing the video signal out of the one or more sensors and texture for the video signal may be calculated using the frequency components of the video image.

Referring to FIG. 6, the frequency components of the video image include first frequency components 610 and second frequency components 620. In this instance, the present invention may use at least one of the first frequency components 610 and second frequency components 620. Especially, the present invention may select AC frequency components out of DC component in the first frequency components 610, and estimate amount of edge components using an average or variance of the selected frequency components. The amount of edge components may represent the texture of an object provided in the video signal, and texture for the video signal may be calculated using the frequency as the contents-dependent feature.

The device described hereinabove may be executed in any suitable device realized by hardware components, software components, and/or a combination of hardware and software components. For instance, the device and components may be realized by using one or more common computers or special purpose computers, which may include a processor, a controller, an Arithmetic Logic Unit (ALU), a digital signal processor, a microcomputer, a Field Programmable Array (FPA), a Programmable Logic Unit (PLU), a microprocessor. The device and components may implement an instruction and respond to the instruction. A processor may execute an operating system (OS) and one or more software applications running on the OS. The processor may store, process, and create data in response to the implementation of software. The processor may store, process, and create data in response to the implementation of software. To make the embodiments of the disclosure understood easily, one processor may be used. It is obvious to the people skilled in the art that the processor includes a plurality of processing elements and/or a processing element having a plurality of types. For instance, the processing device may include a plurality of processors or one processor and one controller. The processing device may have a processing configuration (e.g., a parallel processor).

The software may include a computer program, a code, an algorithm, an instruction, and any combination thereof. The software may include a mechanical language code made by a compiler and a high level language code implementable by a computer, using an interpreter, and the like. The software and/or data may be permanently or temporarily embodied in a preset type of a machine, a component, a physical device, virtual equipment, a computer storage medium or device or a transmitted signal. The software may be dispersed on a computer system or through a network. The software and data may be stored or implemented in one or more computer readable recording medium.

The method according to the embodiments may be realized as program instruction implemented by various computer means and recorded in a computer readable medium. The computer readable medium may include a program command, a data file, a data structure or combination of them. The program command recorded in the medium may be configured for exemplary embodiments of the disclosure. Examples of computer readable medium include magnetic medium such as a hard disk, a floppy disk, optical medium such as CD-ROM and DVD, magneto-optical medium such as a floptical disk, and a hardware device such as ROM, RAM, and a flash memory. The hardware device may be configured to execute one or more software modules to implement the exemplary embodiments. The software may include a computer program, a code, an algorithm, an instruction, and any combination thereof. The software may include a mechanical language code made by a compiler and a high level language code implementable by a computer, using an interpreter, and the like. The software may be dispersed on a computer system or through a network. The software and data may be stored or implemented in one or more computer readable recording medium.

It will be apparent to those skilled in the art that various modifications and variations can be made in the present disclosure without departing from the spirit or scope of the disclosed subject matter.

Thus, it is intended that the present disclosure cover the modifications and variations of the disclosed subject matter provided they come within the scope of the appended claims and their equivalents.

What is claimed is:

1. A video encoding system for dynamically managing energy, a data rate and data distortion comprising:
   an encoder configured to encode a signal obtained by one or more sensors;
   an event sensing unit configured to determine whether an event is generated from the signal obtained by the one or more sensors;
   a memory configured to store the signal encoded by the encoder;
   a power supply unit configured to supply power to the one or more sensors, the event sensing unit, the encoder or the memory;
   an ERD control unit configured to control configuration of the one or more sensors, the event sensing unit, the encoder and the memory; and
   a transmitting/receiving unit configured to transmit the encoded signal to a base station or receive a command associated with the encoded signal from the base station,
   wherein in case a storage space remaining in the memory is smaller than a preset reference storage space, the control unit controls at least one of the energy supplied to the one or more sensors, the energy supplied to the event sensing unit, the energy supplied to the encoder, and the energy supplied to the transmitting/receiving unit,
   wherein the control unit controls the energy supplied to the encoder to encode the signal obtained by the one or more sensors at an encoding bit rate lower than an encoding bit rate for minimizing the sum of the energies consumed by the encoder and the memory.

2. The video encoding system for dynamically managing the energy, the data rate and the data distortion of claim 1, wherein the ERD control unit extracts a contents-dependent feature from the signal obtained through the one or more sensors, and determines at least one control parameter based on the contents-dependent feature.

3. The video encoding system for dynamically managing the energy, the data rate and the data distortion of claim 2, wherein the ERD control unit controls the energy supplied to the one or more sensors, the event sensing unit, the encoder or the memory based on the at least one control parameter.

4. The video encoding system for dynamically managing the energy, the data rate and the data distortion of claim 2, wherein the control unit controls the energy supplied to encoder to minimize the sum of weighted values of the energy consumed by the encoder, a data rate of the encoded signal and data distortion of the encoded signal, based on the at least one control parameter.

5. The video encoding system for dynamically managing the energy, the data rate and the data distortion of claim 4, wherein the control unit estimates data distortion of the encoded signal based on the contents-dependent feature, and controls the energy supplied to the encoder to minimize the sum of weighted values of the energy consumed by the encoder, a data rate of the encoded signal and data distortion of the encoded signal based on the estimated data distortion of the encoded signal.

6. The video encoding system for dynamically managing the energy, the data rate and the data distortion of claim 4, wherein in case the signal obtained by the one or more sensors includes a video signal, the contents-dependent feature comprises at least one of movement of an object provided in the video signal, movement of one sensor sensing the video signal out of the one or more sensors and texture for the video signal.

7. The video encoding system for dynamically managing the energy, the data rate and the data distortion of claim 6, wherein at least one of the movement of the object, the movement of the sensor sensing the video signal and the texture for the video signal is detected, using DCT (Discrete Cosine Transform) coefficients or motion vectors of the video signal.

8. The video encoding system for dynamically managing the energy, the data rate and the data distortion of claim 4, wherein the control unit controls the energy supplied to the one or more sensors, the event sensing unit or the memory in accordance with the energy supplied to the encoder.

9. The video encoding system for dynamically managing the energy, the data rate and the data distortion of claim 2, wherein the control unit minimizes the total energy consumed by the one or more sensors, the event sensing unit, the encoder and the memory.

10. The video encoding system for dynamically managing the energy, the data rate and the data distortion of claim 9, wherein the control unit controls the energy supplied to the encoder and the energy supplied to the memory based on an encoding bit rate for minimizing the sum of the energies consumed by the encoder and the memory.

11. The video encoding system for dynamically managing the energy, the data rate and the data distortion of claim 1, wherein the control unit controls the energy supplied to the one or more sensors and the energy supplied to the event sensing unit, to prevent false positive when determining generation of the event.

12. The video encoding system for dynamically managing the energy, the data rate and the data distortion of claim 1, wherein the control unit controls the energy supplied to the transmitting/receiving unit to transmit the signal encoded by the encoder directly to the base station, not stored in the memory.

* * * * *